Feb. 7, 1961 — H. PETER — 2,970,444
EXPANDING WEDGE TYPE CABLE OR BOLT ANCHOR
Filed March 24, 1958
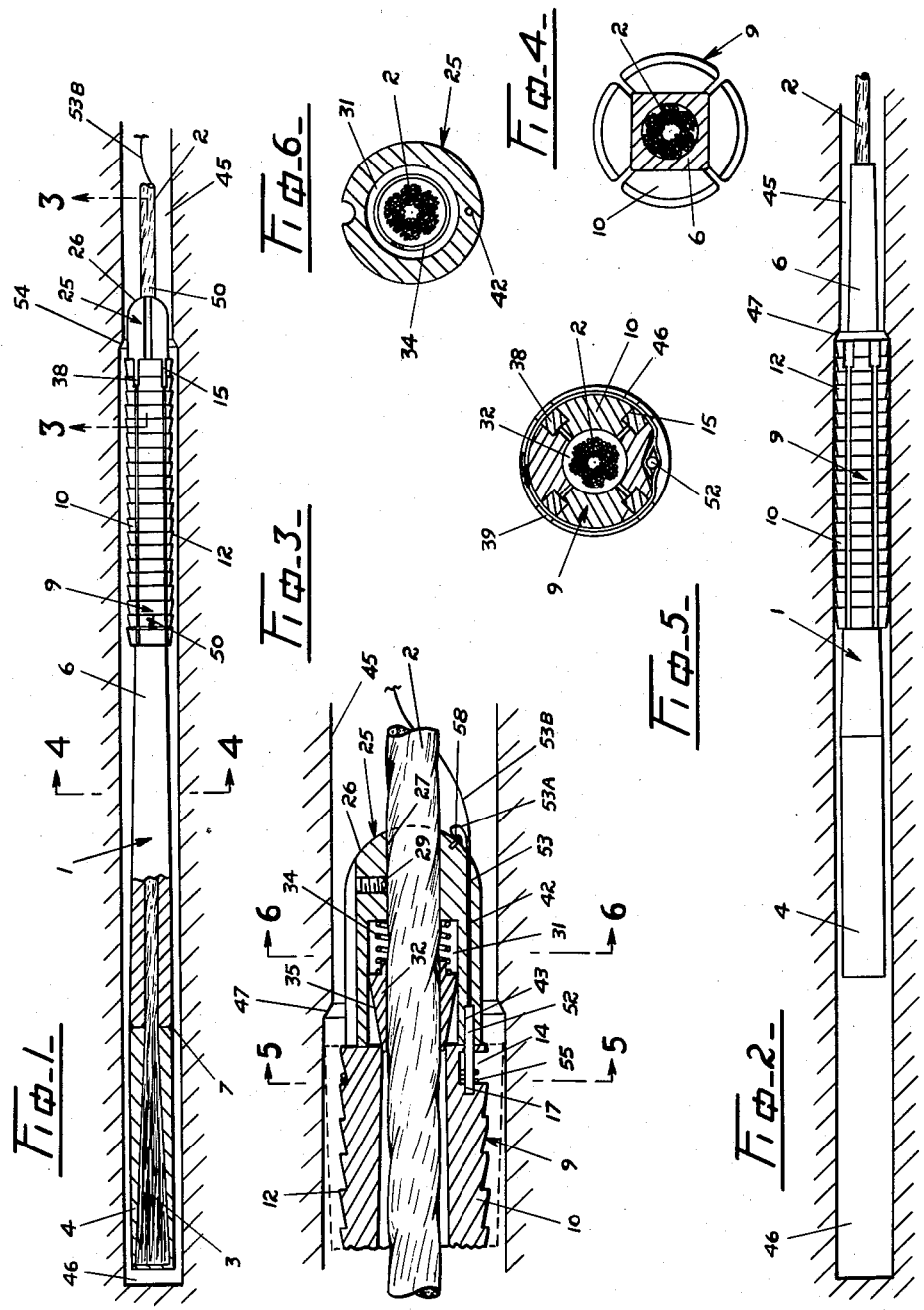
INVENTOR
HEWTON PETER
ATTORNEY

United States Patent Office 2,970,444
Patented Feb. 7, 1961

2,970,444
EXPANDING WEDGE TYPE CABLE OR BOLT ANCHOR

Hewton Peter, 7271 Greenwood St. N., Burnaby, British Columbia, Canada

Filed Mar. 24, 1958, Ser. No. 723,344

2 Claims. (Cl. 61—45)

My invention relates to improvements in expanding wedge type cable or bolt anchor.

The primary object of the present invention is to provide readily releasable means for holding the expanding gripping members of an anchor so that all the assembled anchor parts can be inserted into a blind hole in which the anchor is to be embedded without any of the parts being displaced either radially or longitudinally.

A further object is to provide impact means for spreading the outermost ends of the gripping members into forceful contact with the periphery of the drill hole in advance of the remaining portions of said gripping members.

Other objects and advantages will appear in the following specification.

Referring to the accompanying drawings:

Figure 1 is an elevation, part in section, of the anchor at the inner end of a blind hole and prior to expansion.

Figure 2 is a similar view showing the anchor expanded and wedged to prevent withdrawal of the cable from the hole.

Figure 3 is an enlarged longitudinal section, taken on the line 3—3 of Figure 1.

Figure 4 is an enlarged transverse section taken on the line 4—4 of Figure 1.

Figure 5 is a section taken on the line 5—5 of Figure 3.

Figure 6 is a section taken on the line 6—6 of Figure 3.

While the device is shown as fitted to the stub end of an anchor cable it will be obvious that it is equally well suited for use on anchor bolts or rods.

In the drawings like characters of reference indicate corresponding parts in each figure.

The numeral 1 indicates generally an anchor for a length of cable 2 having an expanded and tapered butt end 3 which is suitably secured within a cylindrical socket 4. Fitted to the cable 2 is a tapered wedge 6 which is secured against sliding movement upon the cable preferably by means of a weld to the socket as at 7. The wedge is square in cross section as shown in Figure 4 and its outer end extends into a tapered sheath 9 which is made up of four elongated segments 10. Each segment 10 is correspondingly tapered to and has sliding contact with a face of the wedge 6 and is capable of independent movement radially of the cable. The outer surface of the sheath 9 is provided with a plurality of suitably spaced tapered ridges which form rock engaging teeth or dogs 12. A transverse groove 14 is provided on the outer end of the sheath and extending into said end beyond the groove are circumferentially spaced longitudinal slots 15, see particularly Figure 5. An opening 17 is drilled into the outer end face of the sheath 9 which opening is parallel to the longitudinal axis of the sheath and extends through the side walls of the groove 14 as as shown in Figure 3 only.

The parts thus far enumerated are held in assembled relation by means of a cylindrical cap 25 having a rounded outer end 26 and a bore 27 through which the cable 2 extends. One or more grub screws 29 are provided in the end 26 which serve to grip the cable and prevent endwise movement of the cap on said cable. The cap 25 is counterbored on its inner face to provide a recess 31 and a tapered collar 32 surrounds the cable and is slidably housed within said recess. A spring 34 is interposed between the collar and the base of the recess and serves to urge said collar into the sheath 9. The adjoining edges of the segments 10 forming the sheath 9 normally bear upon the sloping face 35 of the tapered collar and are adapted to slide along said face when the collar is projected from the recess by the spring 34. The cap 25 is provided with inwardly projecting tongues 38 which are received within the slots 15 in the end of the sheath 9. The tongues are provided with transverse notches 39, see Figure 5 only, which correspond in shape and are aligned with the spaces between the teeth 12 on the sheath segments 10. The cap 25 is drilled longitudinally to provide an opening 42 extending through the rounded end 26 and the drill hole is counterbored from the inner face of the cap to form a circular recess 43.

An anchor hole 45 is drilled into the rock face and is enlarged as at 46 at its inner end to receive the anchor 1 and provide a shoulder 47. To assemble the several parts prior to feeding the device into the hole the sheath 9 is fitted to the wedge 6 and the inner ends of the sheath segments are secured together by a length of light wire 50 which is looped around the segments 10 and its ends twisted together as shown in Figure 1 only. A blasting cap or cartridge 52 is inserted into the opening 17 in the sheath 9 so that its end carrying the wires 53 projects beyond the outer face of said sheath. One or more lengths of wire 55 are suitably secured to the cartridge 52 within the groove 14 and are wound around the segments so as to lodge at the root of the teeth 12 and in the notches 39 of the tongues 38 and their ends are twisted together to bind the sheath to the wedge 6. The cap 25 and its associated parts are moved along the cable and is fastened thereto in abutment with the sheath 9 with the wires 53 being fed through the opening 42, the projecting end of the cartridge 52 being lodged in the recess 43. A grub screw 58 is used to secure the ground wire 53A to the rounded end 26 of the cap and the wire 53B is carefully wound around the cable 2 so as to extend therealong lying in a spiral groove formed by the lay of the cable. The anchor and the cable are then fed into the hole 45 until the blind end 46 is contacted by the butt end 3 of said cable. A suitable battery, not shown, is electrically connected to the wire 53B and the cable 2 to complete the circuit to the cartridge 52 and cause it to detonate. The exploding cartridge breaks the wires 55 and frees the outer ends of the segments 10, whereupon the spring 34 thrusts the collar 32 from the recess 31 and this movement results in the segment ends being forced into contact with the sides of the hole 42. When the cable is pulled slightly the entire anchor moves outwardly until the segment ends abut the shoulder 47 and the sheath 9 is held against further outward movement. A further pull upon the cable causes the wedge 6 to be drawn into the sheath so as to snap the wire 50 and force the segments radially into gripping contact with the sides by the hole. With the device thus securely wedged against the rock the hole 42 may be filled with grout and the free end of the cable used for its appointed purpose.

What I claim as my invention:

1. The combination with an anchor adapted for securing in a drill hole having a shoulder, said anchor including a tension member having a wedge secured to its innermost end and extending longitudinally thereof, said wedge tapering towards its outer end, and coacting wedge shaped segments mounted for free sliding movement on the wedge and adapted for radial expansion as the wedge and the coacting segments are moved in one direction relative to each other to create gripping engagement with the wall of the drill hole forward of said shoulder and remote from the open end of the drill hole, a tapered collar slidably mounted on the tension member adjacent the outer ends of the wedge shaped segments, an abutment secured to the tension member, means carried by the abutment and supporting the outer ends of the wedge shaped segments in spaced relation to the tension member, a spring interposed between the abutment and the tapered collar, said spring urging the tapered collar between the wedge shaped segments and the tension member, the outer end of one of the segments having a transverse groove, a cartridge extending across the transverse groove, said segments having circumferential grooves adjacent the outer ends thereof, a wire loop received in the circumferential groove and having overlapping ends, said ends being secured to the cartridge in the transverse groove and means for electrically detonating the cartridge.

2. The combination with an anchor adapted for securing in a drill hole as claimed in claim 1, wherein the spring abutment has a recess on its inner end and a longitudinal opening communicating with said recess, one end of the cartridge being housed within the recess with a part of the electrical detonating means extending through the longitudinal opening.

References Cited in the file of this patent

UNITED STATES PATENTS

| | | |
|---|---|---|
| 737,101 | Henderson | Aug. 25, 1903 |
| 1,418,538 | Crutcher | June 6, 1922 |
| 2,525,198 | Beijl | Oct. 10, 1950 |
| 2,618,192 | Temple | Nov. 18, 1952 |
| 2,829,502 | Dempsey | Apr. 8, 1958 |

FOREIGN PATENTS

| | | |
|---|---|---|
| 1,056,363 | France | Oct. 21, 1953 |